United States Patent
Kitagawa et al.

(10) Patent No.: US 9,102,236 B2
(45) Date of Patent: Aug. 11, 2015

(54) DISPLAY CONTROL DEVICE FOR REMOTE CONTROL DEVICE

(75) Inventors: Nozomi Kitagawa, Okazaki (JP); Takeshi Haruyama, Kariya (JP); Shouichirou Hanai, Anjo (JP)

(73) Assignee: DENSO CORPORATION, Kariya (JP)

( * ) Notice: Subject to any disclaimer, the term of this patent is extended or adjusted under 35 U.S.C. 154(b) by 820 days.

(21) Appl. No.: 12/923,466

(22) Filed: Sep. 23, 2010

(65) Prior Publication Data

US 2011/0109541 A1    May 12, 2011

(30) Foreign Application Priority Data

Nov. 10, 2009 (JP) ................................. 2009-257106

(51) Int. Cl.
G09G 5/00 (2006.01)
B60K 35/00 (2006.01)
G06F 3/0482 (2013.01)

(52) U.S. Cl.
CPC .............. *B60K 35/00* (2013.01); *G06F 3/0482* (2013.01); *B60K 2350/1004* (2013.01); *B60K 2350/1024* (2013.01); *B60K 2350/925* (2013.01)

(58) Field of Classification Search
USPC .......................................... 345/156–184, 204
See application file for complete search history.

(56) References Cited

U.S. PATENT DOCUMENTS

| | | | |
|---|---|---|---|
| 5,850,212 A * | 12/1998 | Nishibori | 345/160 |
| 5,852,440 A | 12/1998 | Grossman et al. | |
| 2004/0140959 A1 * | 7/2004 | Matsumura et al. | 345/173 |
| 2005/0091615 A1 * | 4/2005 | Suzuki | 715/863 |
| 2008/0231611 A1 * | 9/2008 | Bathiche et al. | 345/175 |
| 2009/0002335 A1 * | 1/2009 | Chaudhri | 345/173 |
| 2009/0007017 A1 * | 1/2009 | Anzures et al. | 715/835 |
| 2009/0140978 A1 * | 6/2009 | Louch | 345/157 |
| 2009/0148027 A1 * | 6/2009 | Paraskevakos | 382/135 |
| 2009/0284467 A1 | 11/2009 | Itoh et al. | |
| 2010/0073336 A1 * | 3/2010 | Lee et al. | 345/204 |

FOREIGN PATENT DOCUMENTS

JP    A-2006-029917    2/2006

* cited by examiner

*Primary Examiner* — Charles V Hicks
*Assistant Examiner* — Jeffrey S Steinberg
(74) *Attorney, Agent, or Firm* — Posz Law Group, PLC

(57) ABSTRACT

A display control device for a remote control device is disclosed. The display control device is configured to have connection with a display device and a remote control device spaced apart from each other. The display device is configured to display an operation screen having multiple icons for accepting an operation directed to a control target apparatus. When display is switched from a first operation screen to a second operation screen having a different icon arrangement, the display control means shifts an icon selection state from one icon selected on the first operation screen to an initial selection icon pre-set on the second operation screen and causes the display device to display a visual effect indicative of a direction from position of the selected one icon to position of the initial selection icon.

15 Claims, 11 Drawing Sheets

FIG. 11
(1) DISPLAY FIRST OPE. SCREEN
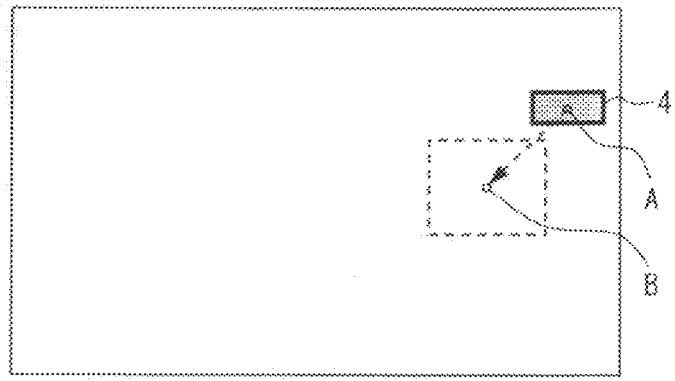
(2) DISPLAY DIRECTION BYPASSING STRAIGHT PATH A-B
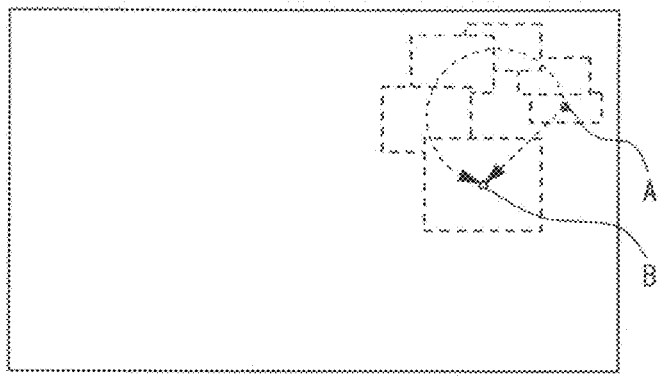
(3) DISPLAY SECOND OPE. SCREEN
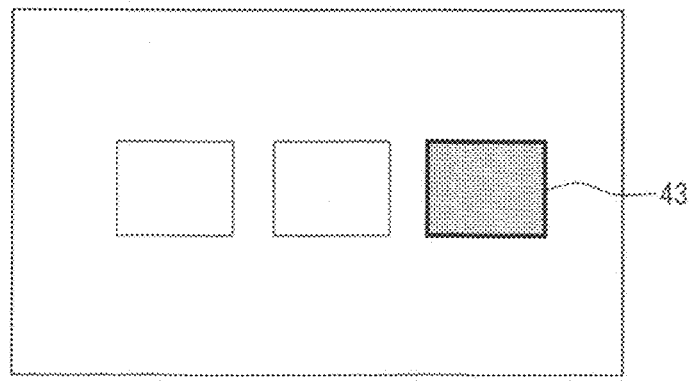

DISPLAY CONTROL DEVICE FOR REMOTE CONTROL DEVICE

CROSS REFERENCE TO RELATED APPLICATION

The present application is based on Japanese Patent Application No. 2009-257106 on Nov. 10, 2009, disclosure of which is incorporated herein by reference.

BACKGROUND OF THE INVENTION

1. Field of the Invention

The present invention relates to a remote control system that includes a display device and a remote control device spaced apart from each other. The display device is configured to display an operation screen for an input of an instruction directed to a control target apparatus. The remote control device is manipulatable by a user in order to point at position on the operation screen and to input the instruction.

2. Description of Related Art

There is known a remote control system for operating an in-vehicle apparatus such as a navigation apparatus, an air conditioner, an audio apparatus and the like via pointing at a certain position on an operation screen displayed on a display device such as a liquid crystal display device and the like. For this type of remote, control system, because of the need for reduction of movement of viewpoint of a driver in driving, it may be preferable that the display device for displaying the operation screen be located as far as possible in front of the driver. Since the remote control device is manipulated to point at position on the operation screen, it may be preferable that the remote control device be located within driver's reach, and the driver can manipulate the remote control device without taking a look at a manipulation member of the remote control device.

JP-A-2006-29917 describes a remote control system including a display device configured to display an operation screen and a manipulation member configured to be manipulatable by a user. The display device and the manipulation member are spaced apart from each other. The remote control system described in JP-A-2006-29917 employs the following operation method (see FIGS. 9(a) and 9(d) of JP-A-2006-29917). A pointer is displayed to continuously indicate a pointed position (i.e., a position pointed by a pointer) on the operation screen. The pointer is operated using the remote control device, and is moved onto an icon to which an instruction directed to an in-vehicle apparatus is assigned. The instruction is issued via selection of the icon. According to the above operation method however, it takes an effort and a time to move the pointer onto a desired position on the operation screen. A period of time for a user to gaze the operation screen is increased, which may be troublesome.

The inventors of the present application have studied a method for selecting an icon from among multiple icons without use of a pointer. An example method without use of a pointer will be described below.

An operation screen containing multiple icons is displayed, so that one of the multiple icons is always in a selection state and the others of the multiple icons are in a non-selection state. An identification display mark such as a cursor and the like is displayed in association with an icon that is now in the selection state, i.e., that is presently selected. When a direction instruction (i.e., an instruction about an operation direction) is inputted with an operation amount greater than or equal to a predetermined amount, the cursor is moved to an icon that is located closest in the operation direction relative to the position of the presently-selected icon, and the selection state is shifted to the closest icon (i.e., a destination icon). According to this method, it is possible to omit an effort of moving the pointer onto position of the destination icon from user operation. Moreover, it is possible to reduce a time for a user to gaze the operation screen, and it is possible to reduce user's operation burden.

In the above-described method, one icon of the multiple icons on the operation screen is always in the selection state. When the instruction about operation direction is inputted, the position of the cursor is accordingly moved from the one icon to another icon. When the display is switched from a first operation screen to a second operation screen having a different icon arrangement, the cursor jumps from position of one icon selected on the first operation screen to position of an initial selection icon pre-set on the second operation screen. The initial selection icon is an icon that is pre-set to be in the selection state on the second operation screen just after the switch of display into the second operation screen.

However, when position of the cursor, which indicates an icon in the selection state, is largely moved due to the switch of the display from one operation screen to another operation screen, a user may lose the position of the cursor.

SUMMARY OF THE INVENTION

In view of the forgoing, it is an objective of the present invention to provide a display control device for a remote control device, the display control device being capable of preventing a user from losing position of an identification display mark even when the identification display mark, which indicates an icon in a selection state, is moved due to switch of display from one operation screen to another operation screen.

According to an aspect of the present invention, a display control device for a remote control device is provided. The display control device is configured to have connection with a display device and a remote control device. The display device is configured to display one operation screen selectively from among multiple operation screens for accepting an operation directed to a control target apparatus. The multiple operation screens include a first operation screen and a second operation screen on each of which a set of icons are arranged. The first operation screen and the second operation screen are different from each other in icon arrangement. The remote control device is spaced apart from the display device and is manipulatable by a user. The display control device is configured to perform display control in manners including the followings. The display control device receives an input of an instruction about an operation direction from the remote control device, performs processing according to the input, and causes the display device to display a, result of the processing on the displayed one operation screen according to the input. The display control device causes the display device to display an identification display mark on the displayed one operation screen, so that: the identification display mark indicates that one icon of the set of icons on the displayed one operation screen, the one icon being presently selected from among the set of icons, is in a selection state; and the identification display mark is displayed in association with the one icon selected on the displayed one operation screen. When display is switched from the first operation screen to the second operation screen, the display control device shifts the selection state from the one icon selected on the first operation screen to an initial selection icon pre-set on the second operation screen and causes the display device to display a visual effect indicative of a direction from position of the selected one icon to position of the initial selection icon.

According to the above display control device, when the position of the identification display mark (e.g., cursor) indicative of an icon in the selection state is largely moved due to the switch of display from the first operation screen to the second operation screen, the visual effect can reliably guide a user to a destination icon (i.e., the initial selection icon). Therefore, the display control device enables a user to easily recognize the position of the initial selection icon on the second operation screen, and improves operability of the remote control device. Moreover, unlike a pointer which is continuously displayed to continuously track or trace a result of a user's manipulation for inputting the instruction about the operation direction, the visual effect indicative of the direction to the initial selection icon on the second operation screen is displayed only when the display is switched from the first operation screen to the second operation screen. Therefore, it is possible to reduce a time for user to gaze the operation windows and a user's operation burden, as compared to the pointer. It should be noted that even when the pointer is displayed in a conventional manner, the use of the visual effect indicative of the direction to the initial selection icon can reduce a user's operation burden accordingly. Therefore, the present invention is applicable to both of a remote control system configured to display a pointer and a remote control system configured not to display a pointer.

BRIEF DESCRIPTION OF THE DRAWINGS

The above and other objects, features and advantages of the present invention will become more apparent from the following detailed description made with reference to the accompanying drawings. In the drawings:

FIG. 11 is a diagram illustrating a visual effect for a case where a distance between an origin icon and a destination is less than or equal to a reference value.

DETAILED DESCRIPTION OF EMBODIMENTS

Embodiments of the present invention will be described below with reference to the accompanying drawings. In should be noted that embodiments of the present invention are not limited to the below-described embodiments. Embodiments of the present invention can have various forms.

(Configuration of Remote Control System)

Figure 1:
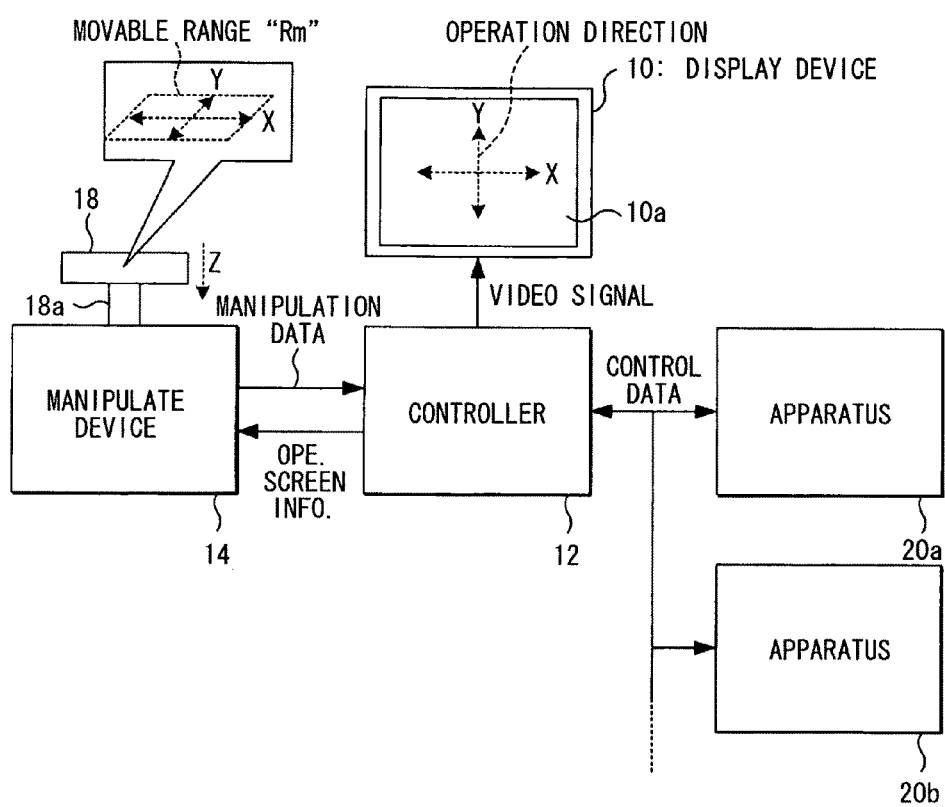
FIG. 1 is a block, diagram illustrating a remote control system.

FIG. 1 is a block diagram schematically illustrating a remote control system according to one embodiment.

The remote control system can be used for operation on an apparatus mounted to, for example, a vehicle. As shown in FIG. 1, the remote control system includes a display device 10, a controller 12, a manipulation device 14, and an apparatus 20. The display device 10 includes a display panel 10a (e.g., a liquid crystal display panel) for displaying thereon an image. The controller 12 controls components of the remote control system. The manipulation device 14 is manipulatable by a user. The apparatus 20 is a control target apparatus, which may be an in-vehicle apparatus. The apparatus 20 may be two apparatuses 20a and 20b. The controller 12 and the manipulation device 14 are connected with each other and communicatable with each other via a dedicated communication line. Via the dedicated communication line, information on an operation screen is transmitted from the controller 12 to the manipulation device 14, and manipulation data is transmitted from the manipulation device 14 to the controller 12. The controller 12 and the apparatuses 20a, 20b are connected with other and communicable with each other via an in-vehicle LAN. Via the in-vehicle LAN, various data on control of each apparatus 20a, 20b is transmitted and received. The controller 12 and the display device 10 are connected with each other via a video line. To the display device 10, the controller 12 transmits a video signal including a signal relating to an operation screen.

Figure 2:
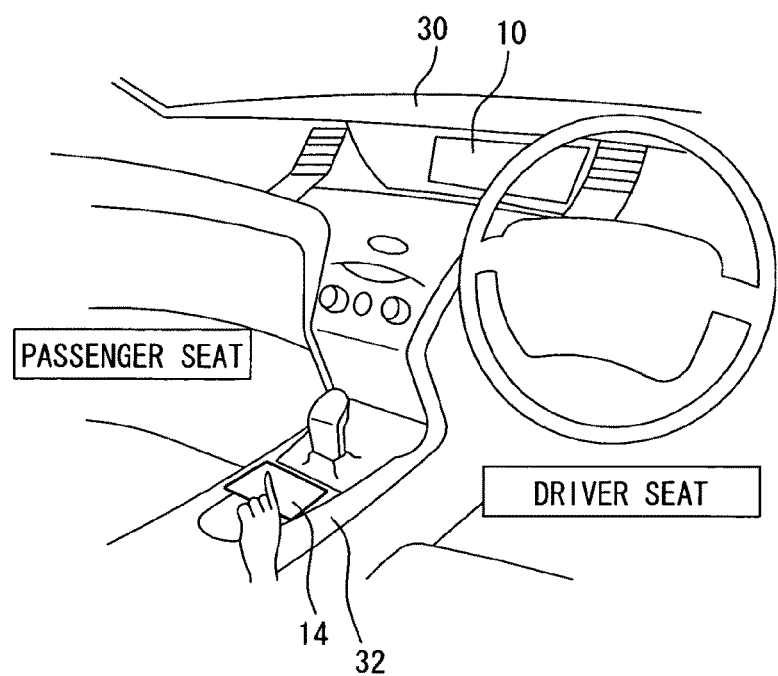
FIG. 2 is a diagram illustrating an arrangement of a display device and a manipulation device.

As shown in FIG. 2, the display device 10 and the manipulation device 14 are placed in a vehicle compartment. The display device 10 is arranged on a dashboard forward of a driver. More specifically, the display device 10 is arranged approximately at a middle of the dashboard 30 between a driver seat and a front passenger seat. This arrangement of the display device 10 can reduce movement of viewpoint of a driver when the driver takes a look at the display panel 10a of the display device 10. The manipulation device 14 is arranged on an upper surface of a center console 32 located directly lateral to the driver seat. This arrangement of the manipulation device 14 enables a driver to easily manipulate the manipulation device 14 without reaching up his or her hand to a distant or without changing his or her position.

Description now returns to the block diagram of FIG. 1.

The manipulation device 14 includes a manipulation knob 18, which is movable in response to user manipulation thereon. A user may be a driver or a front passenger of the vehicle. The manipulation knob 18 includes an axis part 18a. The manipulation knob 18 is movable in two dimensional directions, i.e., in a frontward direction, in a backward direction, a rightward direction, and a leftward direction, while an lower end of the axis part 18a is acting as a pivot point. That is, the manipulation knob 18 can act as a manipulation lever. The manipulation knob 18 returns to a predetermination position, i.e., neutral position, when an external force in the two dimension directions is not applied to the manipulation knob 18 from a user. The manipulation device 14 is operable in a relative input mode, in which the pointed position on the operation screen is determined in a relative manner based on amount of manipulation on the manipulation device 14. The amount of manipulation is for example associated with inclination of the manipulation knob 18 with respect to the neutral position, a force applied to the manipulation knob 18, an input time (e.g., input duration time) etc. The amount of manipulation can determine an operation amount of an operation direction.

In the present embodiment, the manipulation knob 18 is movable in a movable range "Rm" in the two-dimension directions. For explanation purpose, one manipulation direction in the movable range Rm that corresponds to a lateral operation direction (i.e., horizontal direction) on the display panel 10a is defined as an X axis direction or a left-right direction. Another manipulation direction in the movable range Rm that corresponds to a longitudinal operation direction (i.e., vertical direction) on the display panel 10a is defined as a Y axis direction or a front-rear direction. The manipulation knob 18 is further movable in a Z axis diction, i.e., a direction parallel to the axis of the manipulation knob 18 (see the arrow "Z" in FIG. 1). When an external force in the Z axis direction is not applied to the manipulation knob 18, the manipulation knob 18 returns to a predetermined position so that the manipulation knob 18 is located at an upper position along the axis of the manipulation knob 18. The manipulation device 14 further includes: a manipulation direction detection sensor (not shown) for detecting inclination of the manipulation knob 18 toward the X axis direction and the Y axis direction; a pressing manipulation detection sensor (not shown) for detecting the pressing of the manipulation knob 18 in the Z axis direction; a response force generation unit (not shown); and the like. The response force generation unit supports the axis part 18a of the manipulation knob 18, and is configured to apply a response force (e.g., a resistance force) and a vibration force to the axis part 18a. A direction of the resistance force may be opposite to a direction of a manipulation force applied to the manipulation knob 18 in the X direction or the Y direction.

The manipulation device 14 transmits the manipulation data to the controller 12. The manipulation data includes a result of detection by the manipulation direction detection sensor or the pressing manipulation detection sensor. Based on the information on an operation screen inputted from the controller 12, the force generation unit of the manipulation device 14 generates the response force or the vibration force according to how the manipulation device 14 is manipulated and how icons are arranged on the operation screen. As a result, a user can get a resistance force or a click feeling via the manipulation knob 18 according to a situation of the manipulation of the manipulation knob 18 and a situation of the arrangement of icons. The manipulation device 14 can act as a remote control device.

The controller 12 includes a microcomputer unit for controlling the remote control system. The microcomputer unit includes a central processing unit (CPU), a read-only memory (ROM), a random access memory (RAM), a communication interface, and the like, each of which is not shown in the drawings. The controller 12 causes the display device 10 to display an operation screen selectively from among multiple operation screens, which constitute GUI (Graphical User Interface) directed to the control target apparatus 20, e.g., the apparatuses 20a, 20b. Then, when a user selects one of various icon on the displayed operation screen and issues an instruction of execution of a function assigned to the selected one icon, the controller 12 accepts the instruction of execution of the function assigned to the selected one icon and causes the control target apparatus 20 (e.g., the apparatus 20a, 20b) to execute the function assigned to the selected icon. The controller 12 can act as a display control device for a remote control device, which display control device including a display control means or section and a connection means or section.

Each apparatus 20a, 20b is an operation target of the remote control system. For example, the apparatus 20a, 20b may be an air conditioner, an audio visual player, a car navigation apparatus or the like. In one embodiment, two in-vehicle apparatuses 20a and 20b are connected to the remote control system. Alternatively, more than two apparatuses or one apparatus may be the control target of the remote control system.

The remote control system is not limited to having the above-described configuration, and can have a variety of configurations.

For example, although the manipulation device 14 is operable in the relative input mode in the above-described example, the manipulation device 14 may be operable in an absolute input mode in place of or in addition to the relative input mode. In the absolute input mode, a coordinate system is set on a predetermined region (e.g., operation target region) of the operation screen. A coordinate system is also set on the movable range of the manipulation knob 18 in the two dimension directions. The coordinate system of the operation screen has one-to-one correspondence to the coordinate system of the movable range of the manipulation knob 18. A coordinate on the operation target region of the operation screen corresponding to the coordinate of the position of the manipulation knob 18 is determined as a pointed position on the operation screen.

In the above-described example, the manipulation device 14 and the controller 12 are connected with each other via the dedicated communication line. Alternatively, like other components are, the manipulation device 14 may be connected with the controller 12 via the in-vehicle LAN. Alternatively, the controller 12 may be a built-in component of the apparatus 20a, 20b.

(Operation of Remote Control System)

Explanation will be given below on processes performed by the controller 12 of the remote control system of one embodiment. More detailed examples of the processes will be given later.

The operation screen is displayed on display panel 10a of the display device 10. Multiple icons are arranged on the displayed operation screen, and predetermined functions are respectively assigned to the multiple icons. On the operation screen, a cursor or the like acting as an identification display mark is displayed in association with the icon in the selection state, so that the icon in the selection state is visually distinguishable from other icons in the non-selection state. When the instruction about an operation direction is inputted with the manipulation device 14, the cursor is moved to an icon that is located in the operation direction so as to be closest to the icon in the selection state, and the selection state is shifted to the closest icon, i.e., a destination icon.

A variety of operation screens are prepared according to types of control target apparatus, families of operation content or levels of operation content. The multiple operation screens are different from each other in the type of icons, the number of icons, the arrangement of icons etc. Through switching display from one operation screen to another operation screen, it is possible to accept a needed operation from a user. A function of switching the display from one operation screen to another operation screen is assigned to a predetermined icon of the multiple icons. When an instruction of execution is inputted in a state where the predetermined icon is in the selection state, the display is switched to the another operation screen For explanation purpose, one operation screen displayed before the switch of display into another operation screen is referred to as a first operation screen. The another operation displayed after the switch of display is referred to as a second operation screen. Further, it is assumed that the first operation screen and the second operation screen are different from each other in icon arrangement. When the controller 12 switches the display from the first operation screen to the second operation, the controller 12 shifts the selection state from (i) the selected one icon, which has been in the selection state on the first operation screen, to (ii) the initial selection icon, which is pre-set to be first in the selection state on the second operation screen after the switch into the second operation screen. The initial selection icon may be set to a predetermined icon on an operation-screen-by-operation-screen basis. Alternatively, the initial selection icon may be set based on an icon selection history. For example, the initial selection icon on one operation screen may be set to an icon that was selected last time when the one operation screen was displayed, or, the initial selection icon may be set to an icon that has been most frequently selected from among the multiple icons on the one operation screen.

The cursor is displayed in association with an icon in the selection state. When the display is switched to the second operation screen and when the icon in the selection state is accordingly changed to the initial selection icon, the cursor is moved to the position of the initial selection icon. In the above, the controller 12 displays a moving image (i.e., animation), thereby providing a user with a visually effect (i.e., visual presentation) indicative of a movement direction of the cursor. The moving image is displayed as, for example, a design image of the cursor (i.e., an image representing design of the cursor) that moves from the position of the one icon in the selection state on the first operation screen to the position of the initial selection icon on the second operation screen.

Figure 3:
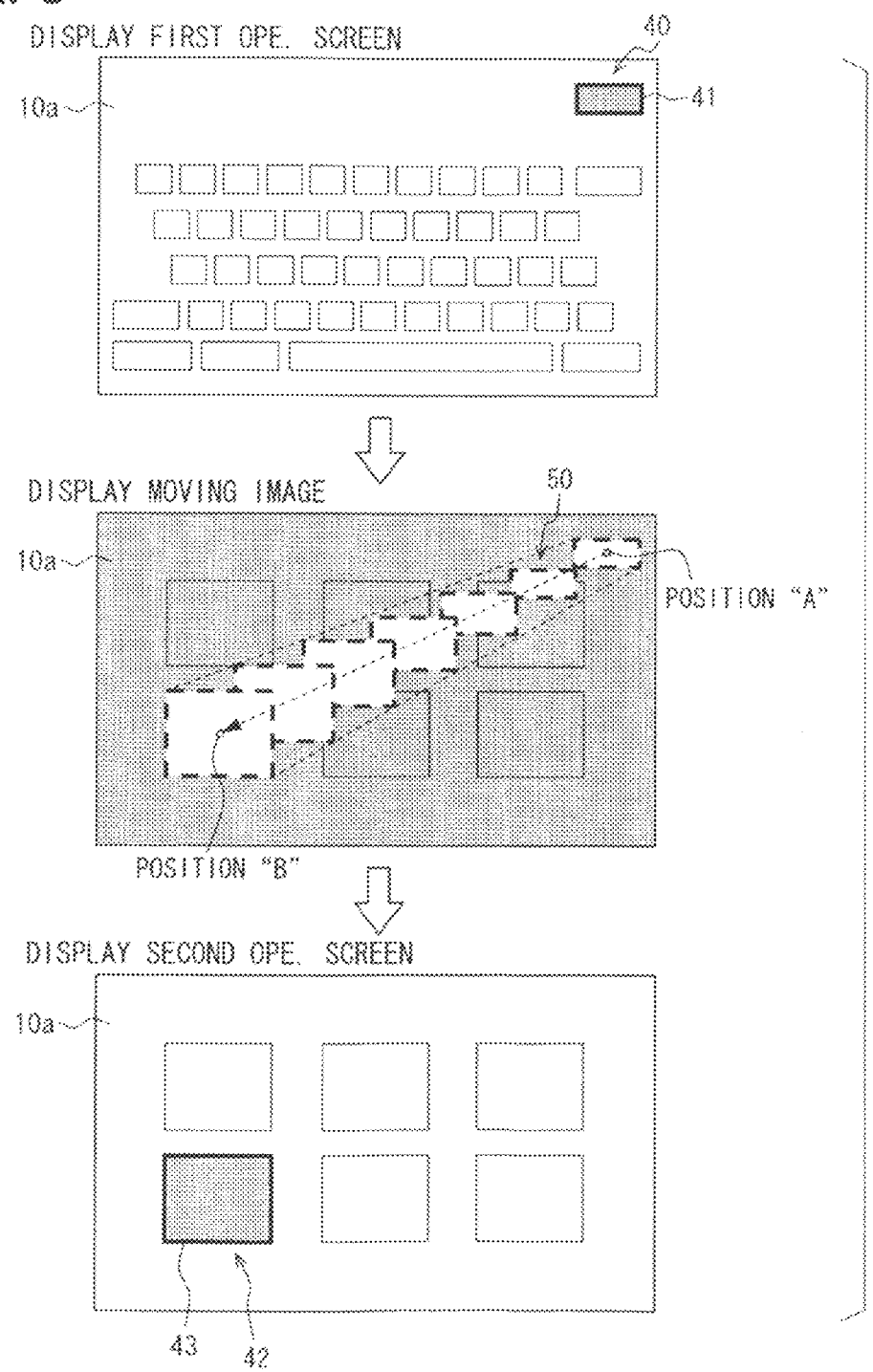
FIG. 3 is a diagram illustrating examples of display for switching from one operation screen to another operation screen.

An example of the operation screen, which the controller 12 displays on the display, panel 10a of the display device 10, is illustrated in the top of FIG. 3. Now, it is assumed for explanation purpose that the operation screen illustrated in the top of FIG. 3 is the first operation screen, i.e., an operation screen before the switching. Predetermined functions are respectively assigned to multiple icons on the operation screen illustrated in the top of FIG. 3. The multiple icons are arranged into a layout like a typical keyboard layout of a PC (personal computer). One icon 40 of the multiple icons is in the selection state (see the top right of the display panel 10a in the top of FIG. 3). An icon in the selection state may be referred to herein as a selected icon or a selected one icon. A cursor 41 is superimposed on a design image of the icon 40 to highlight the icon 40. The cursor 41 acts as an identification display mark for showing to a user that the icon 40 is in the selection state.

For example, the cursor 41 is displayed as an image that highlights an outer edge of the selected one icon, or that highlights color or brightness of the selected one icon. Because of the cursor 41, the selected one icon 40 is visually distinguishable from other icons in the non-selection state. It should be noted that the cursor 41 may not limited to the above example, and can be displayed in different manners as long as the cursor 41 enables a user to visually recognize which icon is in the selection state. A degree (e.g. area) to which the icon 40 and the cursor 41 overlaps each other may be arbitrary. For example, the cursor may be displayed as a background of the selected one icon so that shape of the image of the cursor has similarity to the selected one icon, and size of the image of the cursor is larger than the selected one icon. Alternatively, the icon 40 and the cursor 41 may partially overlap each other.

In one embodiment, a conventional pointer, which is displayed to continuously trace or track the pointed position on an operation screen is not prepared and is not displayed on the operation screens. In place of the conventional pointer, the cursor 41 is displayed in association with the selected one, icon (e.g., the icon 40) so that the cursors 41 enables a user to recognize the present pointed position on the operation screen.

When the manipulation knob 18 of the manipulation device 14 is pressed in the Z axis direction while one icon is being in the selection state on the operation screen, an instruction of execution of a function assigned to the one icon in the selection state is issued to a corresponding one of the apparatuses 20a, 20b or the remote control system. Herein, the pressing of the manipulation knob 18 in the Z axis direction may be referred to as a setting manipulation. When one icon is in the selection state and when the manipulation knob 18 of the manipulation device 14 is pivoted in a certain direction (e.g., the X axis direction, the Y axis direction, an oblique direction between the X axis direction and the Y axis direction) to input the instruction about the operation direction, the selection state is shifted from the one icon in the selection state to the destination icon, which is an icon located in a direction corresponding to the operation direction. When the selection state is moved to the destination icon, the cursor 41 is accordingly moved to the destination icon and displayed in association with the destination icon.

When an instruction of execution is inputted to the icon on the first operation screen illustrated in the top of the FIG. 3 to request the operation screen switching, the display is switched into the second operation screen. In this case, as shown in the middle of FIG. 3, the moving image 50 is displayed while the second operation screen is being toned down and acting as a background. As shown in the middle of FIG. 3, a design image of the cursor smoothly moves from the position "A" of the selected one icon 40 on the first operation screen to the position "B" of the initial selection icon 42 on the second operation screen. This moving image 50 acts as the visual effect indicative of the movement direction of the cursor from the position "A" of the selected one icon 40 on the first operation screen to the position "B" of the initial selection icon 42 on the second operation screen. More specially, the moving image 50 linearly moves in the following ways. First, a design image corresponding to the shape of the selected one icon 40 on the first operation screen starts moving. During the linear movement, shape of the design image of the moving image 50 is gradually changed into a shape corresponding to the initial selection icon 42 on the second operation screen. Finally, the cursor may be drawn so as to be convergent toward the position of the initial selection icon 42. During the display of the moving image 50, the second operation screen is toned down as compared to a normal display state so that the second operation screen is displayed as the background.

The second operation screen (i.e., an operation screen displayed after the switch) is illustrated in the bottom of FIG. 3. After the completion of the display of the moving image 50, the controller 12 stops toning down the second operation screen. That is, the second operation screen is drawn in contrast or brightness for use in a normal state. In addition, as shown in the left bottom of the second operation screen in FIG. 3, a cursor 43 acting as the identification display mark is superimposed on an design image of the initial selection icon 42 so that the cursor 43 highlights the initial selection icon 42 and thereby informs a user that the initial state icon 40 is now in the selection state.

(Explanation on Movement Direction Display Processes)

Figure 4:
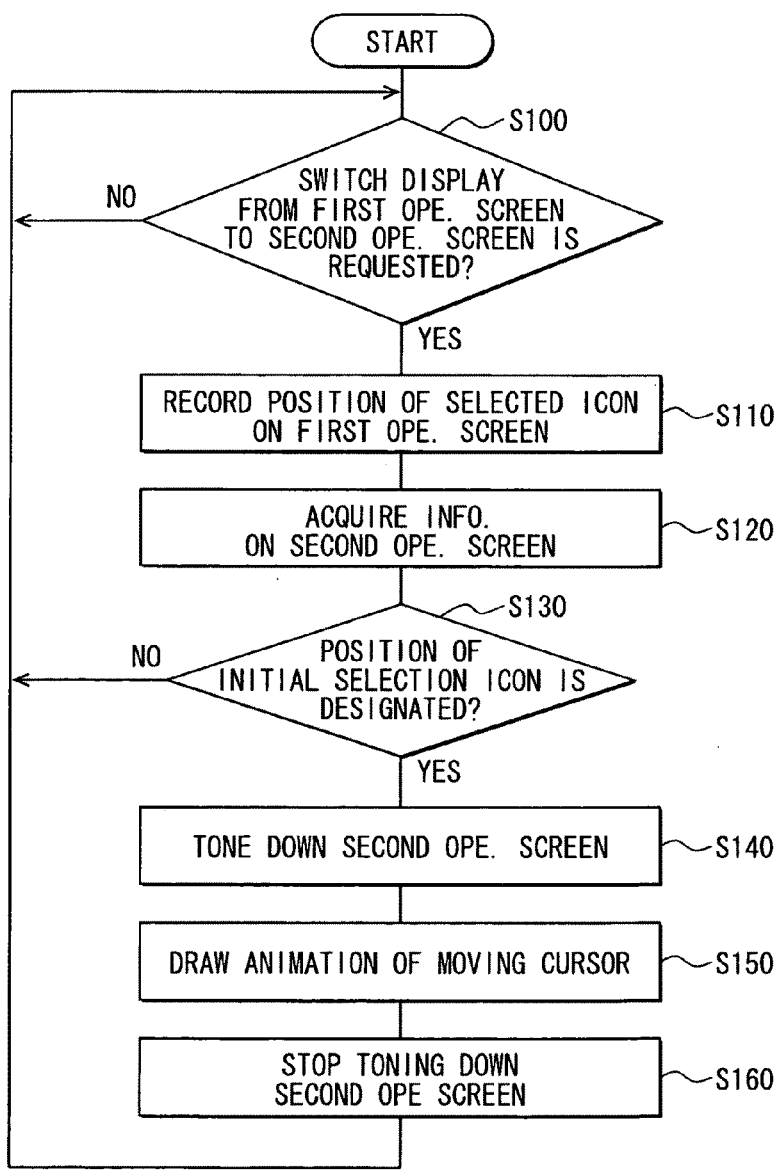
FIG. 4 is a flowchart illustrating a procedure of movement direction displaying processes.

The controller 12 of the remote control system performs processes (also referred to as movement direction display processes) for displaying a movement direction of a cursor at a time of the switch of display from the first operation screen to the second operation screen. With reference to the flowchart illustrated in FIG. 4, a procedure of the movement direction display processes will be described below. The movement direction display processes are performed steadily when the operation screen is displayed. The movement direction display processes may be ended when the display is switched into a screen other than operation screens, or when the remote control system is powered off.

At S100, the controller 12 determines whether the switch of display from the first operation screen to the second operation screen is, requested in response to, for example, the input of an instruction of execution of the icon to which the function of operation screen switching is assigned. When the controller 12 determines that the switch of display is not requested, corresponding to "NO" at S100, the process S100 is repeated. When the controller 12 determines that the switch of display is requested, corresponding to "YES" at S100, the procedure proceeds to S110. At S110, the position of the selected one icon on the first operation screen is recorded in a memory. At S120, the controller 12 acquires data about the second operation screen. The acquired data includes information about positions of icons on the second operation screen and information about the initial selection icon on the second operation screen.

Based on the data acquired at S120, the controller 12 at S130 determines whether the position of the initial selection icon is designated on the second operation screen. When the controller 12 determines that the position of the initial selection icon is not designated on the second operation screen, corresponding to "NO" at S130, the procedure returns to S100. In the case of "NO" at S130, although the display is switched into the second operation screen, the movement direction of the cursor is not displayed. When the controller 12 determines that the position of the initial selection icon is designated, corresponding to "YES" at S130, the procedure proceeds to S140. At S140, the controller 12 tones down the second operation screen displayed on the display panel 10a. At S150, on the toned down second operation screen, the controller 12 draws a moving image (i.e., animation) so that the cursor linearly moves from the position of the selected one icon on the first operation screen to the position of the initial selection icon on the second operation screen. More specifically, the moving image may be drawn in the following manners. At the beginning of the movement of the cursor toward the position of the initial selection icon, the cursor is displayed as a design image corresponding to the shape of the selected one icon on the first operation screen. During the linear movement, the shape of the cursor is gradually changed over time into a shape corresponding to the initial selection icon on the second operation screen. Finally, the cursor is drawn so as to be convergent toward the position of the initial selection icon.

After the completion of the display of the moving image indicative of the movement direction of the cursor, the procedure proceeds to S160. At S160, the controller12 stops toning down the second operation screen and displays the second operation screen in a normal state. After S160, the procedure returns to S100.

Figure 5:
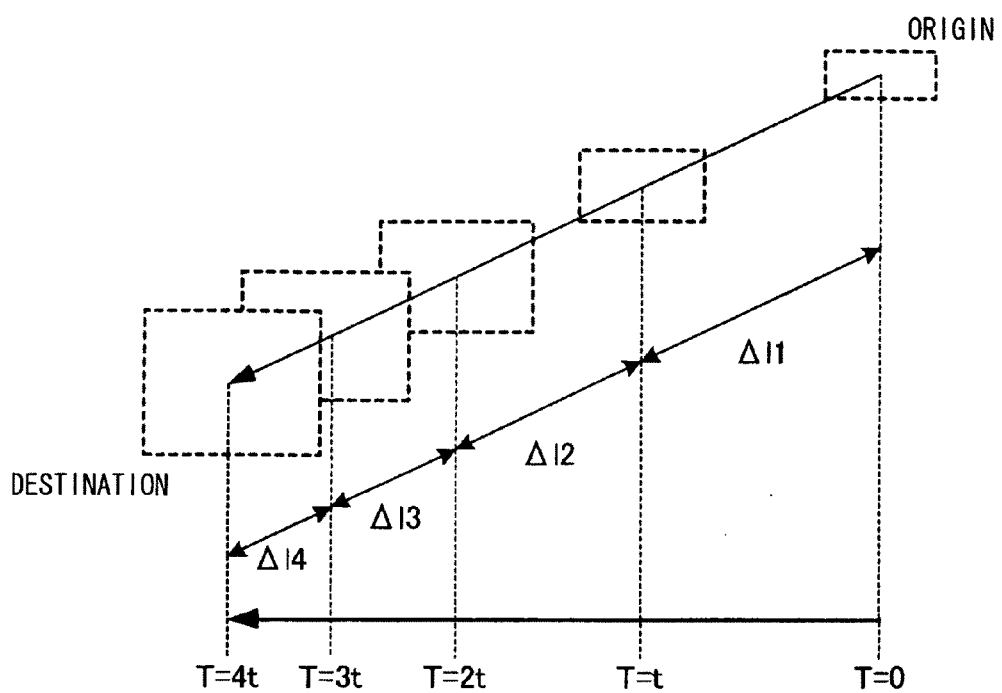
FIG. 5 is a diagram illustrating a change in movement speed of a design image.

When the movement direction of the cursor is presented using the movement of the design image, the movement speed of the design image may be constant from start of the movement to end of the movement. Alternatively, the movement speed of the design image may be changed over time in order to further enhance the visual effect. For example, the movement speed of the design image may be changed in a manner shown in FIG. 5. FIG. 5 is a diagram schematically illustrating trajectory of the design image when the movement speed of the design image is decreased over time during the movement. In FIG. 5, dashed-line boxes show the positions of the design image at predetermined time intervals. In the case illustrated in FIG. 5, the controller 12 displays the moving image (i.e., animation) so that an amount of displacement ($\Delta I1$, $\Delta I2$, $\Delta I3$, $\Delta I4$) of the design image per unit time (t) becomes smaller during a period taken from the start of the movement to the end of the movement (from T=0 to T=4t). According to this manner, the moving image is displayed so that the design image moves fast at the beginning of the movement, and then, the design image speeds down while being slowly convergent toward the destination position, i.e., the position of the initial selection icon. Therefore, a user can surely recognize the position of the initial selection icon.

(Modifications)

Modification examples of the remote control system will be described below. With reference to FIGS. 6A, 6B, 7A and 7B, explanation will be given on examples of modification to the visual effect, which indicates the movement direction of the cursor.

Figure 6A:
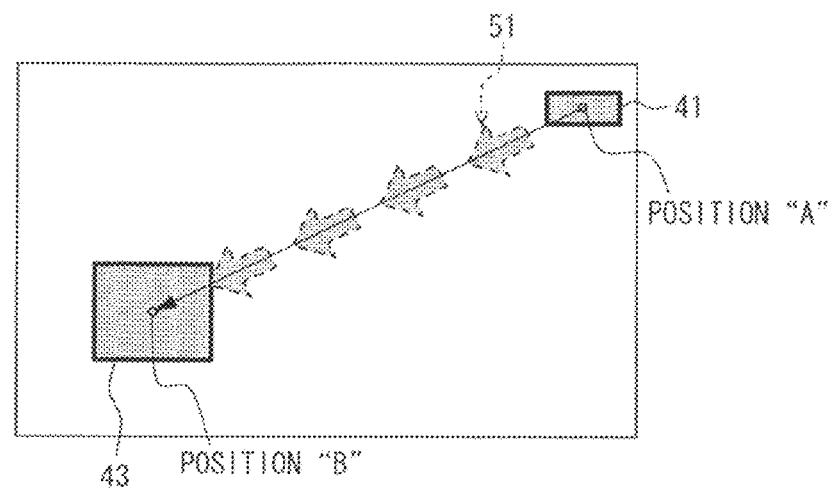
FIGS. 6A, 6B, 7A and 7B are diagrams each illustrating an example of Modification to a visual effect indicative of movement direction of a cursor.

FIG. 6A illustrates an example that can be described as follows. A design image 51 of the moving image is set to an image of arrow, which is different in design from the design image of the cursor. The arrow of the design image 51 points in a direction from the position "A" of the selected one icon to the position "B" of the initial selection icon and moves from the position "A" to the position "B", thereby visually indicating the movement direction of the cursor in the operation screen switching. As can be seen from the above, it is possible to visually present the movement direction of the cursor not only by moving the design image of the cursor but also by moving an image of various marks, characters, symbols, or the like.

Figure 6B:
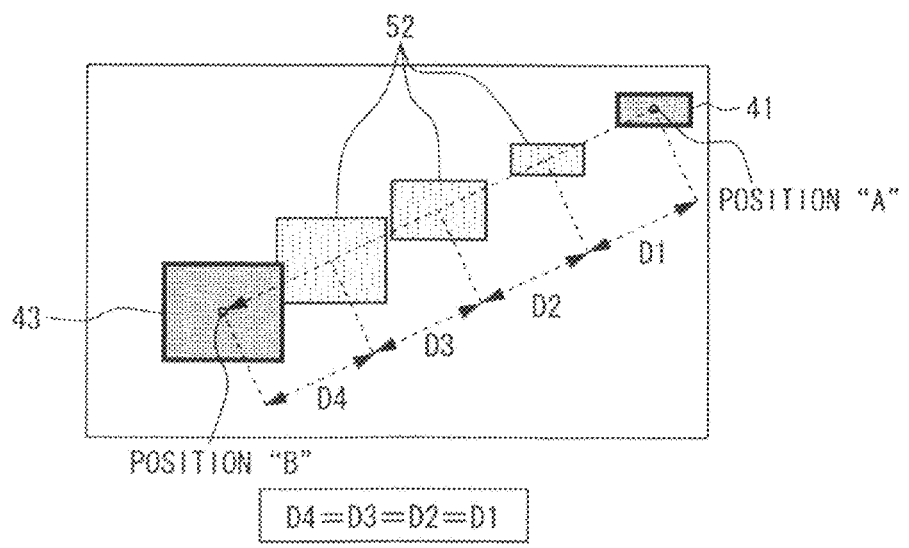

FIG. 6B illustrates an example that can be described as follows. Multiple motionless images 52 are displayed on a straight line path from the position "A" of the selected one icon on the first operation screen to the position "B" of the initial selection icon on the second operation screen. In the case illustrated in FIG. 6B, the multiple motionless images 52 are arranged at equally-spaced intervals on the straight line path interconnecting from the position "A" to the position "B", so the multiple motionless images 52 simulates gradual deformation from the shape of the cursor 41 at the position "A" into the shape of the cursor 43 at the position "B", thereby visually indicating the movement direction of the cursor in the operation screen switching. When the motionless images 52 are used in the above-described way, it is possible to indicate the movement direction of the cursor in a short time of period. Moreover, since the multiple motionless images 52 are arranged at equally-spaced intervals, a user can easily gain a sense of distance between the selected icon and the initial selection icon.

Figure 7A:
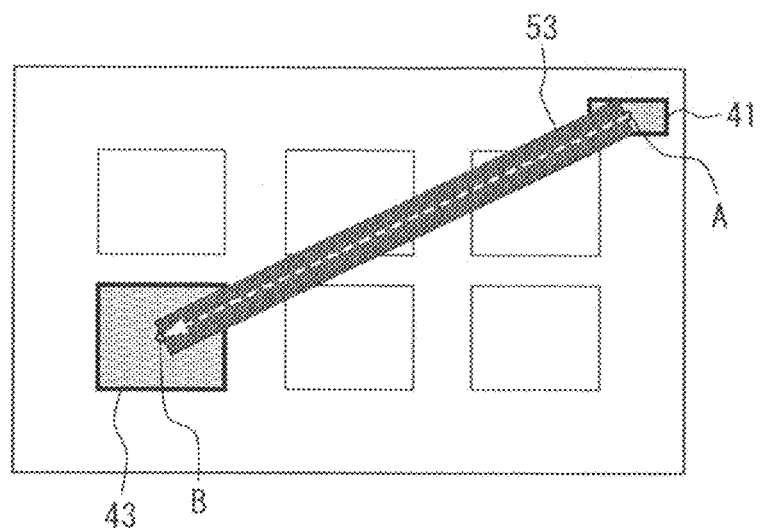

FIG. 7A illustrate an example that can be described as follows. A belt-shaped image 53 is displayed on the straight line path interconnecting between the position "A" of the selected one icon on the first operation screen and the position "B" of the initial selection icon on the second operation screen. In the case illustrated in FIG. 7A, the belt-shaped image 53 interconnecting the position "A" (i.e., origin position) and the position "B" (i.e., destination position) visually indicates the movement direction of the cursor in the operation screen switching.

Figure 7B:
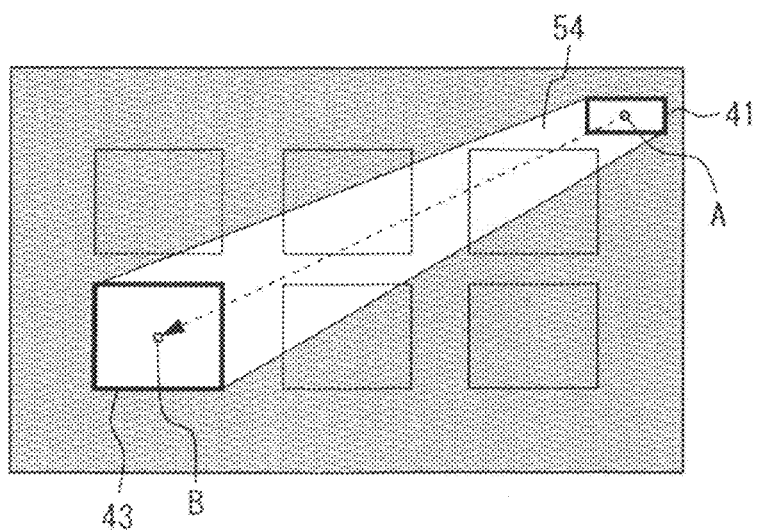

FIG. 7B illustrates an example that can be described as follows. The controller 12 tones down regions of the display other than a region of the position "A" of the selected icon on the first operation screen, a region of the position "B" of the initial selection icon on the second operation screen and a region in the vicinity of the straight line path interconnecting between the position "A" and the position "B". In the case illustrated in FIG. 7B, since regions of the display other than the region between the position "A" and the position "B" are toned down, the region between the position "A" and the position "B" are highlighted. Thereby, the movement direction of the cursor in the operation screen switching is visually indicated.

The visual effects in FIGS. 7A and 7B explicitly indicates the path connecting between the position "A" of the selected icon and the position "B" of the initial selection icon. Therefore, it is possible to reliably guide a user from the position of the selected one icon to the position of the initial selection icon on the second operation screen.

Figure 8:
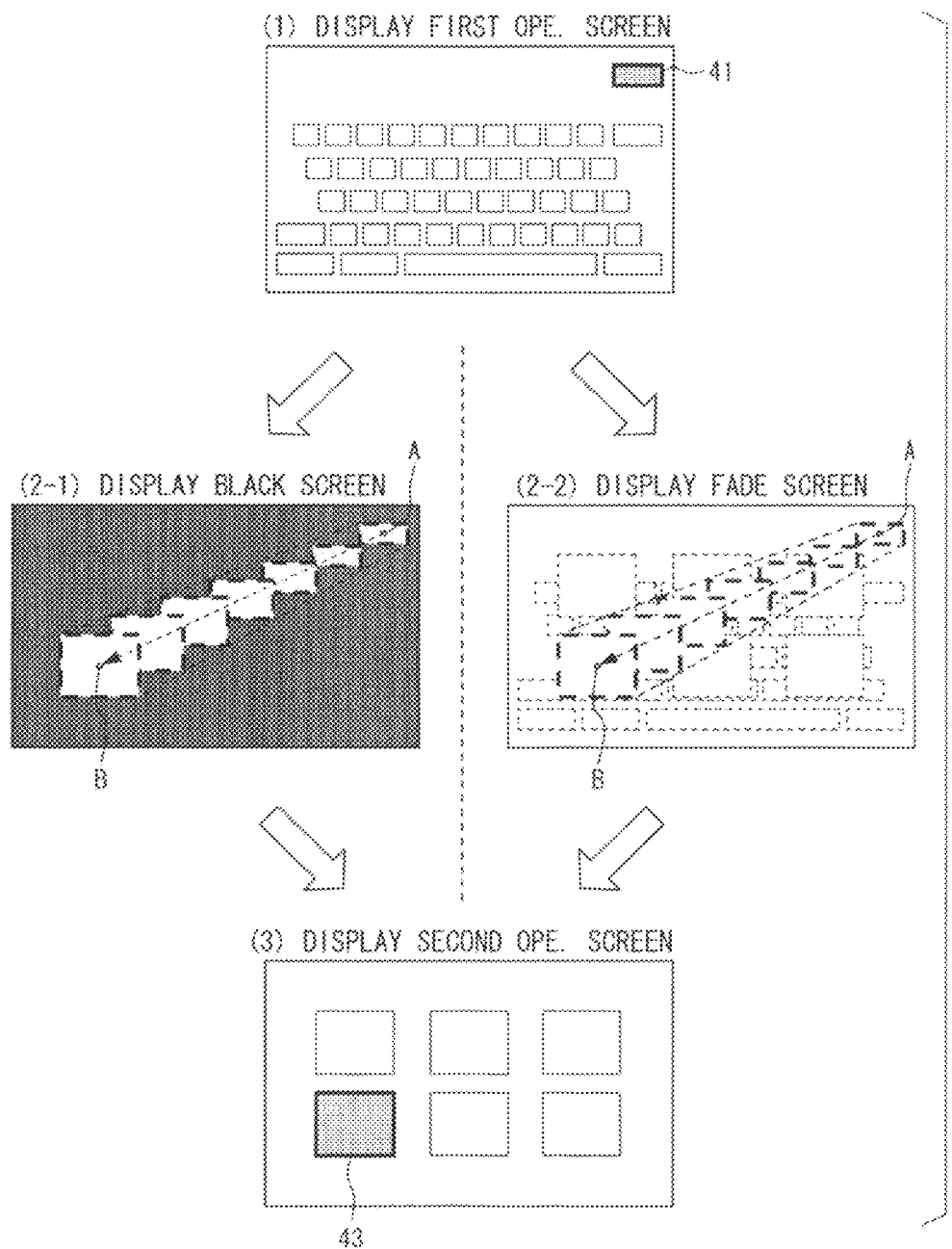
FIG. 8 is a diagram illustrating one example of modification to display timing of a visual effect indicative of movement direction of a cursor.
Figure 9:
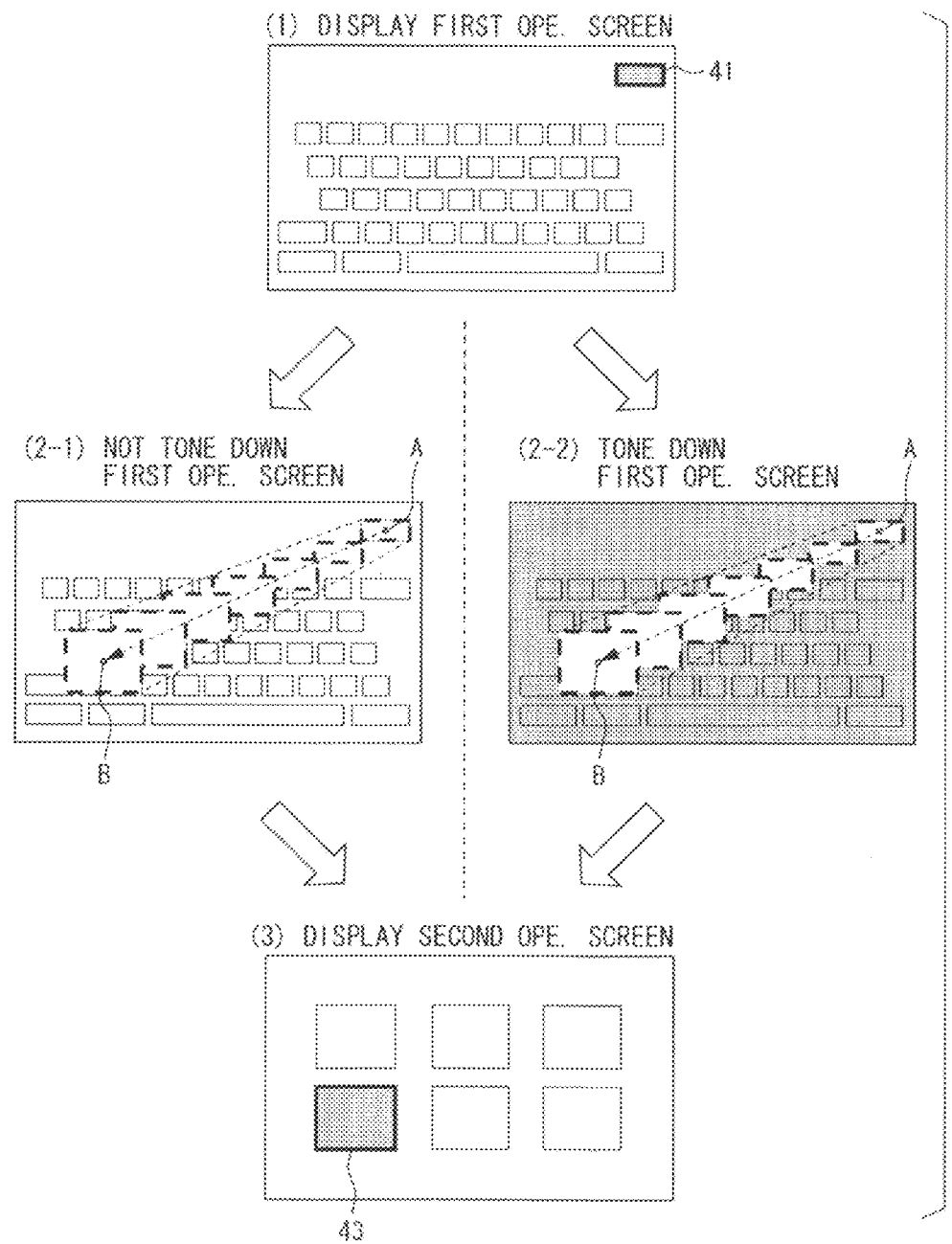
FIG. 9 is a diagram illustrating another example of modification to display timing of a visual effect indicative of movement direction of a cursor.
Figure 10:
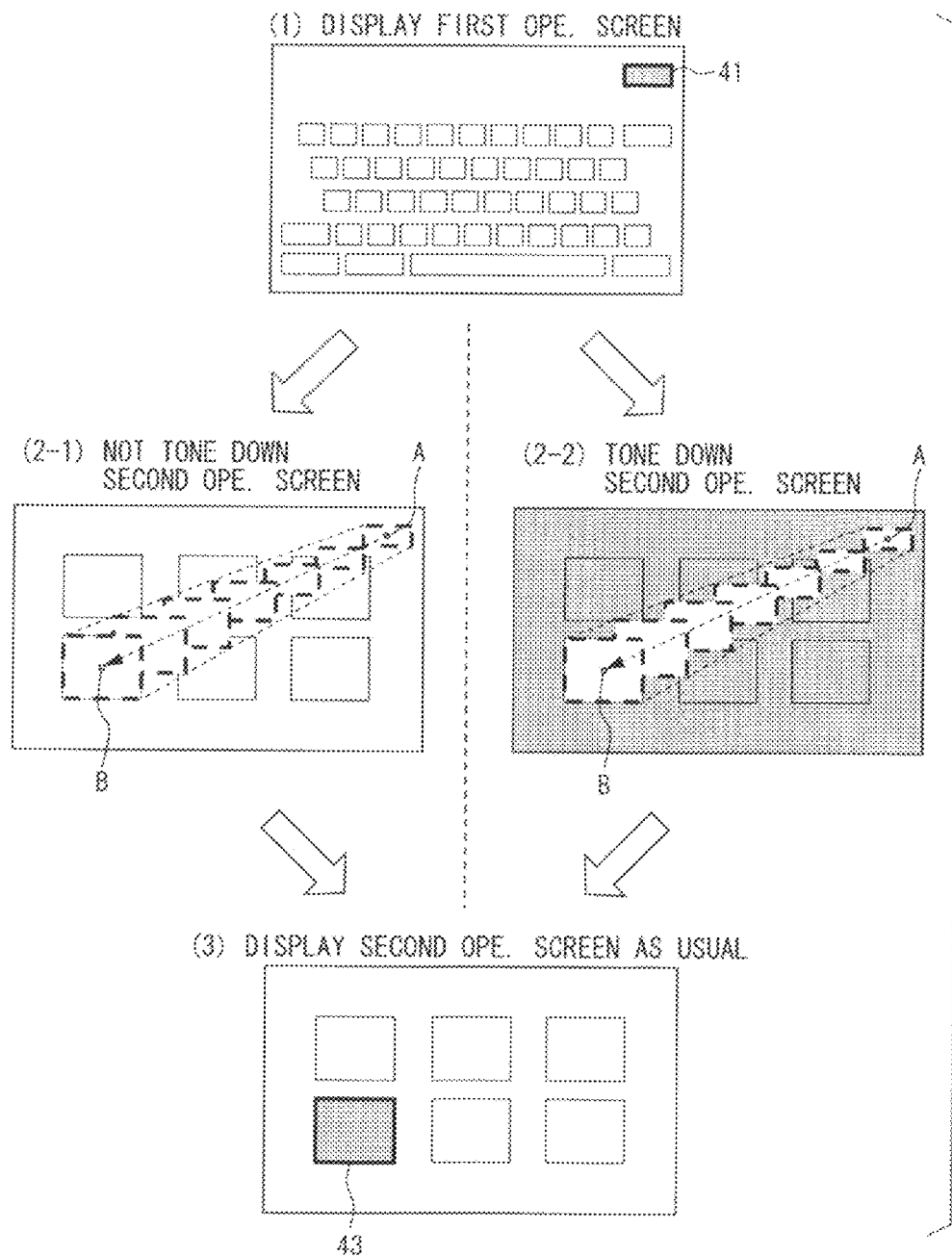
FIG. 10 is a diagram illustrating yet another example of modification to display timing of a visual effect indicative of movement direction of a cursor.

With reference to FIGS. 8 to 10, explanation will be given on examples of modification to display timing of the visual effect, which indicates the movement direction of the cursor.

FIG. 8 illustrates an example that can be described as follows. When the display is switched from the first operation screen to the second operation screen, a transition screen is displayed for a transition period of time between the first operation screen and the second operation screen. The transition screen is, for example, a black screen, a fade screen or the like. The back screen and the fade screen will be described below.

At a stage (1) illustrated in FIG. 8, the cursor 41 acting as the identification display mark for identification of an icon in the selection state is displayed on the right top of the first operation screen.

The function of switching the display from the first operation screen to the second operation screen is assigned to an icon on the first operation. When an instruction of the execution of the function assigned this icon is inputted, the display is switched from the first operation screen to the back screen, as shown as a stage (2-1) in the middle left of FIG. 8. During a period of displaying the black screen, a moving image is displayed on the black screen so that that the design image of the cursor moves from the position "A" of the selected one icon on the first operation screen to the position "B" of the initial selection icon on the second operation screen. By using the moving image, the direction of the movement of the cursor is visually presented. After the completion of the display of the moving image, the second operation screen is displayed, as shown as a stage (3) in the bottom of the FIG. 8. The cursor 43 acting as the identification display mark for identification of the initial selection icon is displayed at a bottom left of the second operation screen.

Alternatively, as shown as a stage (2-2) in the middle right of the FIG. 8, the fade screen may be displayed as the transition screen. In the fade screen, the first operation screen fades out and the second operation screen fades in. In this fade screen, the second operation screen may fade in after the first operation screen has completely faded out. Alternatively, the second operation screen may fade in while the first operation screen is fading out. During a period of displaying the fade screen, a moving image is displayed so that the design image of the cursor moves from the position "A" to the position "B". After the display device 10 finishes displaying the moving image indicative of the movement direction of the cursor, the display device 10 displays the second operation screen, as shown as a stage (3) in the bottom of FIG. 8.

The visual effect displayed on the transition screen such as the black screen, the fade screen and the like is not limited to the above-described example illustrated in FIG. 8. The visual effects illustrated in FIGS. 6A, 6B, 7A and 7B or other visual effects may be displayed on the transition screen. When the transition screen such as the black screen, the fade screen and the like is pre-prepared as a staging effect for the switch of display from the first operation screen to the second operation screen, the visual effect indicative of the movement direction of the cursor may be displayed on the transition screen. When the transition screen as a staging effect is not pre-prepared, an alternative screen may be inserted as a transition screen so that the visual effect indicative of the movement direction of the cursor is displayed on the alternative screen.

FIG. 9 illustrates an example that can be described as follows. When the switch of the display from the first operation screen to the second operation screen is requested, the visual effect indicative of the movement direction of the cursor is displayed on the first screen just before the display is switched into the second operation screen. The controller 12 may or may not tone down the first operation screen in displaying the visual effect indicative of the movement direction of the cursor on the first operation screen. As shown as a stage (1) in the top of FIG. 9, the cursor 41 acting as the identification display mark for identification of an icon in the selection state is displayed at a top right of the first operation screen.

The function of switching the display from the first operation screen to the second operation screen is assigned to an icon. When the execution of the function assigned to this icon is inputted, the moving image 50 is displayed, as shown as a stage (2-1) in the middle left of FIG. 9. At the stage (2-1), the design image of the cursor smoothly moves from the position "A" of the selected one icon on the first operation screen to the position "B" of the initial selection icon on the second operation screen while the first operation screen is not being toned down and is being displayed as a background. By using the moving image, the direction of the movement of the cursor is visually presented. Note that the movement of the cursor results from the switch of display from first operation screen to the second operation screen. After the completion of the display of the moving image indicative of the movement direction of the cursor, the display is switched into the second operation screen, as shown as a stage (3) in the bottom of FIG. 9. The second operation screen is displayed so that the cursor 43 acting as the identification display mark for identification of the initial selection icon is displayed at a left button of the second operation screen.

Alternatively, as shown as a stage (2-2) in the middle right of FIG. 9, the first operation screen may be toned down and the moving image is display so that that the design image of the cursor moves from the position "A" to the position "B" while the toned-down first operation screen is being displayed as a background. By toning down the first operation screen as the background, it is possible to improve visibility of the visual effect indicative of the movement direction of the cursor. Moreover, it is possible to provide an effective guidance regarding the movement of the cursor. After the completion of the display of the moving image indicative of the movement direction of the cursor, the second operation screen is displayed, as shown as the stage (3) in the bottom of FIG. 9.

The visual effect displayed on the first operation screen is not limited to the above-described example illustrated in FIG. 9. The visual effects illustrated in FIGS. 6A, 6B, 7A and 7B or other visual effects may be displayed on the first operation screen.

FIG. 10 illustrates an example that can be described as follows. When the switch of the display from the first operation screen to the second operation screen is requested, the visual effect indicative of the movement direction of the cursor is displayed on the second screen just after the switch of display into the second operation screen. During a period of displaying the visual effect on the second operation screen, the second operation screen may be toned down or may not be toned down. At a stage (1) illustrated in FIG. 10, the cursor 41 acting as the identification display mark for identification of an icon in the selection state is displayed at a right top of the first operation screen.

The function of switching the display from the first operation screen to the second operation screen is assigned to an icon on the first operation screen. When the execution of the function of this icon is inputted, the display is directly switched from the first operation screen to the second operation screen, as shown as a stage (2-1) in the middle left of FIG. 10. Just after the switch of display into the second operation screen, the moving image is displayed so that the design image of the cursor moves from the position "A" of the selected one icon on the first operation screen to the position "B" of the initial selection icon on the second operation screen while the second operation screen is not being toned down and is being displayed as a background. By using the moving image, the direction of the movement of the cursor is visually presented. Note that the movement of the cursor results from the switch of display from first Operation screen to the second operation screen. After the completion of the display of the moving image indicative of the movement direction of the cursor, the second operation screen is displayed as usual, as shown as stage (3) in the bottom of FIG. 10. The second operation screen is displayed so that the cursor 43 acting as the identification display mark for identification of the initial selection icon is displayed at a left bottom of the second operation screen.

Alternatively, as shown as a stage (2-2) in the middle right of FIG. 10, the second operation screen may be toned down upon the switch of the display from the first operation screen to the second operation screen. The moving image is display so that the design image of the cursor moves from the position "A" to the position "B" while the toned-down second operation screen is being displayed as a background. By toning down the second operation screen as the background, it is possible to improve visibility of the visual effect indicative of the movement direction of the cursor. It is possible to provide an effective guidance regarding the movement of the cursor. After the completion of the display of the moving image indicative of the movement direction of the cursor, the second operation screen is displayed as usual, as shown as the stage (3) in the bottom of FIG. 10.

The visual effect displayed on the second operation screen upon the switch of the display into the second operation screen is not limited to the above-described example in FIG. 10. The visual effects illustrated in FIGS. 6A, 6B, 7A and 7B or other visual effects may be displayed on the second operation screen.

With reference to FIG. 11, explanation will be given on a case where the origin position of the cursor on the first operation screen is so close to the destination position of the cursor on the second operation screen. In this case, when the visual effect is presented in the below-described way, the visual effect indicative of the movement direction of the cursor can have a high visibility.

At a stage (1) in the top of FIG. 11, the cursor acting as the identification display mark for identification of the selected one icon is displayed at the position "A", which is the top right of the first operation screen in the case of FIG. 11. The case in FIG. 11 assumes that the position "B" of the initial selection icon on the second operation screen is located in the vicinity of the position "A". When the position "A", which is an origin position of the cursor, and the position "B", which is a destination position of the cursor, are so closed to each other, the straight line path interconnecting between the position "A" and the position "B" can be a small place for display of the visual effect indicative of the movement direction of the cursor. Thus, if the visual effect indicative of the movement direction of the cursor is displayed in this small space, its visibility may be poor and the high guidance cannot be provided.

In view of the above, when a distance between the position "A" and the position "B" is less than or equal to a reference value, the movement direction of the cursor is displayed along a path that bypasses the straight line path interconnecting between the position "A" and the position "B", as shown as a stage (2) in the middle of FIG. 11. More specifically, the moving image is displayed so that the design image of the cursor moves from the position "A" to the position "B" along a circular arc path interconnecting between the position "A" and the position "B". The length of the circular path is larger than the straight line path. According to this manner, the visual effect indicative of the movement direction of the cursor can spread over a distance that is sufficient to provide an effective guidance regarding the movement direction of the cursor. After the completion of the display of the moving image indicative of the movement direction of the cursor; the second operation screen is displayed, as shown as a stage (3) in the bottom of FIG. 11.

Alternatively, the remote control system may be configured in the following way. When a distance between the position "A" and the position "B" is less than or equal to the reference value, the visual effect indicative of the movement direction of the cursor may not be displayed. Alternatively, when a distance between the position "A" and the position "B" is less than or equal to a first rank reference value, the visual effect indicative of movement direction of the cursor is displayed along a path bypassing a straight line path interconnecting between the position "A" and the position "B". When the distance between the position "A" and the position "B" is less than or equal to a second rank reference value that is smaller than the first rank reference value, the visual effect indicative of movement direction of the cursor may not be displayed.

(Advantages)

Advantages of the above-described remote control system include the following. When the display is switched from the first operation screen to the second operation screen, a display target of the cursor (i.e., an icon displayed in association with the cursor) is changed from the selected one icon on the first operation screen into the initial selection icon on the second operation screen. In the switch of the display, a visual effect (e.g., moving image, motionless image, belt-shaped image, highlighting, etc.) indicative of a direction from the selected one icon to the initial selection icon is displayed on, for example, the first operation screen, the second operation screen etc. Thus, even when the position of the identification display mark (e.g., cursor), which indicates an icon in the selection state, is largely changed due to the switch of the display, the visual effect can guide a user to the destination position of the cursor. Therefore, a use can easily recognize the position of the initial selection icon on the second operation screen, and it is possible to improve operability of the remote control device.

Unlike a conventional pointer which is continuously displayed to track or trace a result of the input of the operation direction from a user, the visual effect indicative of the direction to the initial selection icon on the second operation screen is displayed only when the display is switched from the first operation screen to the second operation screen. Therefore, it is possible to reduce a time for user to gaze the operation window and it is possible to lower a user's operation burden, compared to the use of a conventional pointer. It should be noted that one embodiment may not display the conventional pointer from a standpoint of reduction of a time for a user to gaze the display panel in operating the pointer. However, according to an idea of the above-described embodiment, even when the pointer is displayed on the display panel, the use of the visual effect indicative of the direction to the second operation screen can reduce a user's operation burden accordingly. Therefore, in another embodiment, the remote control system may be configured to display a pointer. The remote control system configured to display a pointer can involve the advantages.

(Aspects)

According to an aspect of the present disclosure, a display control device for a remote control device can be provided. The display control device includes a connection means and a display control means. The connection means is configured to have connection with a display device and a remote control device. The display device is configured to display one operation screen selectively from among a plurality of operation screens for accepting an operation directed to a control target apparatus. The plurality of operation screens includes a first operation screen and a second operation screen on each of which a set of icons are arranged. The first operation screen and the second operation screen are different from each other in icon arrangement. The remote control device is spaced apart from the display device and is manipulatable by a user. The display control means is configured to perform display control in manners including the following. The display control means receives an input of an instruction about an operation direction from the remote control device, performs processing according to the input, and causes the display device to display a result of the processing on the displayed one operation screen according to the input. The display control means causes the display device to display an identification display mark on the displayed one operation screen, so that: the identification display mark indicates that one icon of the set of icons on the displayed one operation screen, the one icon being presently selected from among the set of icons, is in a selection state; and the identification display mark is displayed in association with the one icon selected on the displayed one operation screen. When display is switched from the first operation screen to the second operation screen, the display control means shifts the selection state from the one icon selected on the first operation screen to an initial selection icon pre-set on the second operation screen and causes the display device to display a visual effect indicative of a direction from position of the selected one icon to position of the initial selection icon.

According to the above display control device, even when the position of the identification display mark (e.g., cursor) indicative of an icon in the selection state is largely moved due to the switch of display from the first operation screen to the second operation screen, the visual effect can reliably guide a user to a destination icon (i.e., the initial selection icon). Therefore, the display control device enables a user to easily recognize the position of the initial selection icon on the second operation screen, and improves operability of the remote control device.

Moreover, unlike a pointer which is continuously displayed to continuously track or trace a result of a user's manipulation for inputting the operation direction, the visual effect indicative of the direction to the initial selection icon on the second operation screen is displayed only when the display is switched from the first operation screen to the second operation screen. Therefore, it is possible to reduce a time for user to gaze the operation windows and a user's operation burden, compared to the pointer. It should be noted that even when the pointer is displayed in a conventional manner, the use of the visual effect indicative of the direction to the initial selection icon can reduce a user's operation burden accordingly. Therefore, the above display control device is applicable to both of a remote control system configured to display a pointer and a remote control system configured not to display a pointer.

The above display control device may be configured in the following way. The display control means causes the display device to display a moving image which moves from the position of the selected one icon to the position of the initial selection icon, thereby causing the display device to display the visual effect indicative of the direction to the position of the initial selection icon. The identification display mark is displayed to have a design image in association with the selected one icon. The display control means causes the display device to display the moving image such that the moving image is the design image of the identification display mark moving from the position of the selected one icon to the position of the initial selection icon, and thereby displaying the visual effect indicative of the direction to the initial selection icon. According to this configuration, a change in position of an icon in the selection state can be presented to a user in a easily-understandable manner.

The above display control device may be configured in the following way. The identification display mark in association with the selected one icon on the first operation screen is displayed to have a first design image. The identification display mark in association with the initial selection icon on the second operation screen is displayed to have a second design image. The first design image and the second design image are different from each other in design. The display control means causes the display device to display the moving image such that the moving image moves from the position of the selected one icon to the position of the initial selection icon, while design of the moving image is changing over time from the design of the first design image to the design of the second design image. According to this configuration, it is possible to inform a user of the shape of the icon to which the selection state is shifted on the second operation screen, in an easily-understandable manner.

The above display control device may be configured such that: the display control means causes the display device to display the moving image such that speed of the moving image becomes slower over time in moving from the position of the selected one icon to the position of the initial selection icon. According to this configuration, since the moving image is slowly convergent in the vicinity of the initial selection icon (i.e., a destination icon), a use can surely recognize the destination position of the cursor.

The above display control device may be configured such that: the display control means causes the display device to display a motionless design image between the position of the selected one icon and the position of the initial selection icon, thereby displaying the visual effect indicative of the direction to the initial selection icon. According to this configuration, since the motionless image is placed at a predetermined position, the display of the visual effect can be completed in a short period of time compared to a case where the moving image is moved.

The above display control device may be configured such that: the display control means causes the display device to display multiple motionless design images between the position of the selected one icon and the position of the initial selection icon, thereby displaying the visual effect indicative of the direction to the initial selection icon. When the multiple motionless design images are placed at equally-spaced intervals, a user can easily get a sense of distance between the selected one icon and the initial selection icon. Therefore, operability is improved.

The above display control device may be configured such that: the display control means causes the display device to display a belt-shaped image connecting between the position of the selected one icon and the position of the initial selection icon, thereby displaying the visual effect indicative of the direction to the initial selection icon. Alternatively, the above display control device may be configured such that: when the display is switched from the first operation screen to the second screen, the display control means tones down regions of the display other than a region of the selected one icon, a region of the initial selection icon and a region between the selection one icon and the initial selection icon, thereby causing the display device to display the visual effect indicative of the direction to the initial selection icon. According to the above configurations, a path interconnecting between the position of the selected one icon and the position of the initial selection icon is explicitly presented. Therefore, it is possible to surely guide a user from the position of the selected one icon to the position of the initial selection icon on the second operation screen.

Incidentally, when a distance between the position of the selected one icon on the first operation screen and the position of the initial selection icon on the second operation screen is relatively small, it is conceivable that a user may have little difficulty in recognizing the destination position of the cursor in the switching of display. As the distance between the selected one icon and the initial selection icon is smaller, visibility of the visual effect displayed, between the selected one icon and the initial selection icon is lower, and the guidance performance may be lower.

In view of the above, the display control device may be configured such that: when a distance between the position of the selected one icon and the position of the initial selection icon is less than or equal to a reference value, the display control means prohibits the display device from displaying the visual effect indicative of the direction from the position of the selected one icon to the position of the initial selection icon. Alternatively, the display control device may be configured such that: when a distance between the position of the selected one icon and the position of the initial selection icon is less than or equal to a reference value, the display control means causes the display device to display the visual effect indicative of the direction from the position of the selected one icon to the position of the initial selection icon so that the visual effect is displayed along a path that bypasses a straight line interconnecting between the position of the selected one icon and the position of the initial selection icon. According to this configuration, even when the distance between the selected one icon and the initial selection icon is small, the visual effect indicative of the direction can be visualized in a long space to an extent that the visual effect indicative of the direction is perceptible by a user.

Incidentally, regarding timing of displaying the visual effect indicative of the direction to the initial selection icon on the second operation screen, it is conceivable that the visual effect is displayed during transition from the first operation screen to the second operation screen, in other words, during a period before the completion of the switch of display into the second operation screen.

For example, the display control device may be configured such that: when the display is switched from the first operation screen to the second screen, the display control means causes the display device to display a black screen for a predetermined period of time between the first operation screen and the second operation screen; and the display control means causes the display device to display the visual effect, which indicates the direction from the position of the selected one icon to the position of the initial selection icon, on the black screen. Alternatively, the display control device may be configured such that: during the switch of the display from the first operation screen to the second operation screen, the display control means cause the display device to display a fade screen in which the first operation screen fades out and the second operation screen fades in; the display control means causes the display device to display the visual effect, which indicates the direction from the position of the selected one icon to the position of the initial selection icon, on the fade screen.

Alternatively, the above display control device may be configured such that: the display control means causes the display device to display the visual effect, which indicates the direction from the position of the selected one icon to the position of the initial selection icon, on the second operation screen for a predetermined period of time after completion of the switch of the display from the first operation screen into the second operation screen. Further, the display control means may tone down the second operation screen and displays the visual effect, which indicates the direction form the direction from the position of the selected one icon to the position of the initial selection icon, on the toned down second operation screen. According to the above manner, it is possible to improve the visibility of the visual effect indicative of the direction, and it is possible to provide a high guidance performance regarding the movement of the identification display mark.

Alternatively, the above display control device may be configured such that: the display control means displays the visual effect, which indicates the direction form the position of the selected one icon to the position of the initial selection icon, on the first operation screen for a predetermined period of time before start of the switch of the display from the first operation screen to the second operation screen. Further, when the display is switched from the first operation screen to the second operation screen, the display control means may tone down the first operation screen and displays the visual effect, which indicates the direction form the position of the selected one icon to the position of the initial selection icon, on the toned down first operation screen.

While the invention has been described above with reference to various embodiments thereof, it is to be understood that the invention is not limited to the above described embodiments and constructions. The invention is intended to cover various modifications and equivalent arrangements.

Further, each or any combination of procedures, processes, steps, or means explained in the above may be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units may be included in a software program, which is contained in a computer-readable storage media or is installed in a computer via a communications network.

What is claimed is:
1. A display control device for a remote control device, the display control device comprising:
a processor; and
a memory storing instructions that, when executed, cause the processor to connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and perform, by a display control section, display control, such that:

the display control section receives an input of an instruction about an operation direction from the remote control device, performs processing according to the input, and causes the display device to display a result of the processing on the displayed one operation screen according to the input;

the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;

the icons of the first operation screen include a switch function icon, which is assigned a function to switch display from the first operation screen to the second operation screen;

the icons of the second operation screen include an initial selection icon, which is preset to be in the selection state upon switching the display from the first operation screen to the second operation screen; and when the display is switched from the first operation screen to the second operation screen in response to input by the user of an instruction to execute the function of the switch function icon selected on the first operation screen, the processor determines whether the initial selection icon is pre-designated on the second operation screen, when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;

when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second atm screen:

the display control section (i) moves the cursor from the switch function icon selected on the first operation screen to the initial selection icon pre-set on the second operation screen, (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:

the display control section causes the display device to display a moving image which moves from the position of the switch function icon on the first operation screen along the predetermined direction to the position of the initial selection icon on the second operation screen, thereby causing the display device to display the visual effect indicative of the predetermined direction to the position of the initial selection icon, and the display control section causes the display device to display the moving image such that speed of the moving image becomes slower over time while moving from the position of the switch function icon to the position of the initial selection icon;

when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:

the display control section switches from the first operation screen to the second operation screen without displaying the moving image and the visual effect indicative of the predetermined direction to the position of the initial selection icon.

2. The display control device according to claim 1, wherein:

the cursor is displayed to have a design image in association with the selected one icon; and the display control section causes the display device to display the moving image such that the moving image is the design image of the cursor moving from the position of the switch function icon to the position of the initial selection icon, and thereby displaying the visual effect indicative of the predetermined direction to the initial selection icon.

3. The display control device according to claim 2, wherein:

the cursor in association with the selected one icon on the first operation screen is displayed to have a first design image;

the cursor in association with the initial selection icon on the second operation screen is displayed to have a second design image;

the first design image and the second design image are different from each other in design; and the display control section causes the display device to display the moving image such that the moving image moves from the position of the switch function icon to the position of the initial selection icon while design of the moving image is changing over time from the design of the first design image to the design of the second design image.

4. The display control device according to claim 1, wherein:
the display control section causes the display device to display a motionless design image between the position of the switch function icon and the position of the initial selection icon, thereby displaying the visual effect indicative of the predetermined direction to the initial selection icon.

5. The display control device according to claim 4, wherein:
the display control section causes the display device to display a plurality of motionless design images between the position of the switch function icon and the position of the initial selection icon, thereby displaying the visual effect indicative of the predetermined direction to the initial selection icon.

6. A display control device for a remote control device, the display control device comprising:
processor; and
a memory storing instructions that, when executed, cause the processor to
connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and
perform, by a display control section, display control, such that:
the display control section receives an input of an instruction about an operation direction from the remote control device, performs processing according to the input, and causes the display device to display a result of the processing on the displayed one operation screen according to the input;
the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;
the icons of the first operation screen include a switch function icon, which is assigned a function to switch display from the first operation screen to the second operation screen;
the icons of the second operation screen include an initial selection icon, which is preset to be in the selection state upon switching the display from the first operation screen to the second operation screen; and
when the display is switched from the first operation screen to the second operation screen in response to input by the user of an instruction to execute the function of the switch function icon selected on the first operation screen, the processor determines whether the initial selection icon is pre-designated on the second operation screen,
when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;
when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:
the display control section (i) moves the cursor from the switch function icon selected on the first operation screen to the initial selection icon pre-set on the second operation screen, (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:
the display control section causes the display device to display a belt-shaped image connecting between the position of the switch function icon and the position of the initial selection icon, thereby displaying the visual effect indicative of the predetermined direction to the initial selection icon;
when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:
the display control section switches from the first operation screen to the second operation screen without displaying the moving image and the visual effect indicative of the predetermined direction to the position of the initial selection icon.

7. A display control device for a remote control device, the display control device comprising:
a processor; and
a memory storing instructions that, when executed, cause the processor to
connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and perform, by a display control section, display control, such that:

the display control section receives an input of an instruction about an operation direction from the remote control device, performs processing according to the input, and causes the display device to display a result of the processing on the displayed one operation screen according to the input;

the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;

the icons of the first operation screen include a switch function icon, which is assigned a function to switch display from the first operation screen to the second operation screen;

the icons of the second operation screen include an initial selection icon, which is preset to be in the selection state upon switching the display from the first operation screen to the second operation screen; and when display is switched from the first operation screen to the second operation screen in response to input by the user of an instruction to execute the function of the switch function icon selected on the first operation screen, the processor determines whether the initial selection icon is pre-designated on the second operation screen, when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;

when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:

the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted the operation direction being relative to the switch function icon, wherein:

when the display is switched from the first operation screen to the second screen, the display control section tones down regions of the display other than a region of the switch function icon, a region of the initial selection icon and a region between the switch function icon and the initial selection icon, thereby causing the display device to display the visual effect indicative of the predetermined direction to the initial selection icon;

when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:

the display control section switches from the first operation screen to the second operation screen without displaying the moving image and the visual effect indicative of the predetermined direction to the position of the initial selection icon.

8. A display control device for a remote control device, the display control device comprising:

a processor; and a memory storing instructions that, when executed, cause the processor to connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and perform, by a display control section, display control, such that:

the display control section receives an input of an instruction about an operation direction from the remote control device, performs processing according to the input, and causes the display device to display a result of the processing on the displayed one operation screen according to the input;

the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;

the icons of the first operation screen include a switch function icon, which is assigned a function to switch display from the first operation screen to the second operation screen;

the icons of the second operation screen include an initial selection icon, which is preset to be in the selection state upon switching the display from the first operation screen to the second operation screen; and when the display is switched from the first operation screen to the second operation screen in response to input by the user of an instruction to execute the function of the switch function icon selected on the first operation screen, the processor determines whether the initial selection icon is pre-designated on the second operation screen,
when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;
when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:
the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:
when a distance between the position of the switch function icon and the position of the initial selection icon is less than or equal to a reference value, the display control section prohibits the display device from displaying the visual effect indicative of the predetermined direction from the position of the switch function icon to the position of the initial selection icon;
when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:
the display control section switches from the first operation screen to the second operation screen without displaying the moving image and the visual effect indicative of the predetermined direction to the position of the initial selection icon.

9. A display control device for a remote control device, the display control device comprising:
a processor; and
a memory storing instructions that, when executed, cause the processor to connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and
perform, by a display control section, display control, such that:
the display control section receives an input of an instruction about an operation direction from the remote control device, performs processing according to the input, and causes the display device to display a result of the processing on the displayed one operation screen according to the input;
the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;
the icons of the first operation screen include a switch function icon, which is assigned a function to switch display from the first operation screen to the second operation screen;
the icons of the second operation screen include an initial selection icon, which is preset to be in the selection state upon switching the display from the first operation screen to the second operation screen; and
when the display is switched from the first operation screen to the second operation screen in response to input by the user of an instruction to execute the function of the switch function icon selected on the first operation screen, the processor determines whether the initial selection icon is pre-designated on the second operation screen,
when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;
when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:
the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:

when a distance between the position of the switch function icon and the position of the initial selection icon is less than or equal to a reference value, the display control section causes the display device to display the visual effect indicative of the predetermined direction from the position of the switch function icon to the position of the initial selection icon so that the visual effect is displayed along a path that bypasses a straight line interconnecting between the position of the switch function icon and the position of the initial selection icon;

when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:

the display control section switches from the first operation screen to the second operation screen without displaying the moving image and the visual effect indicative of the predetermined direction to the position of the initial selection icon.

10. A display control device for a remote control device, the display control device comprising:

a processor; and a memory storing instructions that, when executed, cause the processor to connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and display, by a display control section, display control, such that:

the display control section receives an input of an instruction about an operation direction from the remote control device, performs processing according to the input, and causes the display device to display a result of the processing on the displayed one operation screen according to the input;

the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;

when the display is switched from the first operation screen to the second operation screen in response to input by the user of an instruction to execute the function of the switch function icon selected on the first operation screen, the processor determines whether the initial selection icon is pre-designated on the second operation screen, when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;

when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:

the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:

when the display is switched from the first operation screen to the second screen, the display control section causes the display device to display a black screen for a predetermined period of time between the first operation screen and the second operation screen; and the display control section causes the display device to display the visual effect, which indicates the predetermined direction from the position of the switch function icon to the position of the initial selection icon, on the black screen;

when the display is switched from the first operation screen to the second operation screen in response to input by the user of an instruction to execute the function of the switch function icon selected on the first operation screen and it is determined that the position of the initial selection icon on the second operation screen is not pr designated in the acquired data about the second operation screen:

the display control section switches from the first operation screen to the second operation screen without displaying the moving image and the visual effect indicative of the predetermined direction to the position of the initial selection icon.

11. A display control device for a remote control device, the display control device comprising:

processor; and
a memory storing instructions that, when executed, cause the processor to
connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and
perform, by a display control section, display control, such that:
  the display control section receives an input of an instruction about an operation direction from the remote control device, performs processing according to the input, and causes the display device to display a result of the processing on the displayed one operation screen according to the input;
  the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;
  the icons of the first operation screen include a switch function icon, which is assigned a function to switch display from the first operation screen to the second operation screen;
  the icons of the second operation screen include an initial selection icon, which is preset to be in the selection state upon switching the display from the first operation screen to the second operation screen; and
  when the display is switched from the first operation screen to the second operation screen in response to input by the user of an instruction to execute the function of the switch function icon selected on the first operation screen, the display control section (i) moves the cursor from the switch function icon selected on the first operation screen to the initial selection icon pre-set on the second operation screen and (ii) causes the display device to display a visual effect indicative of a predetermined direction from position of the switch function icon to position of the initial selection icon, the position of the initial selection icon is pre-set on the second operation screen when the instruction to execute the function of the switch function icon is inputted, the operation direction being relative to the switch function icon, wherein:
during the switch of the display from the first operation screen to the second operation screen, the display control section cause the display device to display a fade screen in which the first operation screen fades out and the second operation screen fades in;
the display control section causes the display device to display the visual effect, which indicates the predetermined direction from the position of the switch function icon to the position of the initial selection icon, on the fade screen.

12. A display control device for a remote control device, the display control device comprising:
a processor; and
a memory storing instructions that, when executed, cause the processor to
connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and
perform, by a display control section, display control, such that:
  the display control section receives an input of an instruction about an operation direction from the remote control device, performs processing according to the input, and causes the display device to display a result of the processing on the displayed one operation screen according to the input;
  the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;
  the icons of the first operation screen include a switch function icon, which is assigned a function to switch display from the first operation screen to the second operation screen;
  the icons of the second operation screen include an initial selection icon, which is preset to be in the selection state upon switching the display from the first operation screen to the second operation screen; and
  when the display is switched from the first operation screen to the second operation screen in response to input by the user of an instruction to execute the function of the switch function icon selected on the first operation screen, the processor determines whether the initial selection icon is pre-designated on the second operation screen,
  when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;
  when the display is switched from the first operation screen to the second operation screen in response to input by the user of an instruction to execute the function of the switch function icon selected on the first operation screen and it is determined that the position of the initial selection icon on the second operation screen is pre-designated in the acquired data about the second operation screen:

the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:

the display control section causes the display device to display the visual effect, which indicates the predetermined direction from the position of the switch function icon on the first operation screen to the position of the initial selection icon on the second operation screen, on the second operation screen for a predetermined period of time after completion of the switch of the display from the first operation screen into the second operation screen;

when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:

the display control section switches from the first operation screen to the second operation screen without displaying the moving image and the visual effect indicative of the predetermined direction to the position of the initial selection icon.

13. The display control device according to claim 12, wherein:
the display control section tones down the second operation screen and displays the visual effect, which indicates the predetermined direction from the position of the switch function icon to the position of the initial selection icon, on the toned down second operation screen.

14. A display control device for a remote control device, the display control device comprising:
a processor; and
a memory storing instructions that, when executed, cause the processor to
connect, by a connection section, with a display device and a remote control device, wherein the display device is configured to display one operation screen selectively from among a plurality of operation screens for accepting an operation directed to a control target apparatus, wherein the plurality of operation screens includes a first operation screen and a second operation screen on each of which a set of icons are arranged, wherein the first operation screen and the second operation screen are different from each other in icon arrangement, wherein the remote control device is spaced apart from the display device and is manipulatable by a user; and
perform, by a display control section, display control, such that:

the display control section receives an input of an instruction about an operation direction from the remote control device, performs processing according to the input, and causes the display device to display a result of the processing on the displayed one operation screen according to the input;

the display control section causes the display device to display a cursor on the displayed one operation screen, so that: the cursor indicates that one icon of the set of icons on the displayed one operation screen, the one icon being presently selected from among the set of icons, is in a selection state; and the cursor is displayed in association with the one icon selected on the displayed one operation screen;

the icons of the first operation screen include a switch function icon, which is assigned a function to switch display from the first operation screen to the second operation screen;

the icons of the second operation screen include an initial selection icon, which is preset to be in the selection state upon switching the display from the first operation screen to the second operation screen; and when the display is switched from the first operation screen to the second operation screen in response to input by the user of an instruction to execute the function of the switch function icon selected on the first operation screen, the processor determines whether the initial selection icon is pre-designated on the second operation screen, when the initial selection icon is determined to be pre-designated on the second operation screen when the display is switched to the second operation screen, the processor sets the initial selection icon on the second operation screen to the selection state, wherein the selection state indicates that an instruction of execution will cause the function assigned to the one icon in the selection state to be executed, and the processor acquires data about the second operation screen and determines based on the acquired data whether a position of the initial selection icon on the second operation screen is pre-designated;

when the display is switched from the first operation screen to the second operation screen in response to input by the user of an instruction to execute the function of the switch function icon selected the first operation screen and it is determined that the position of the initial selection icon on the second operation screen is pre-designated in the acquired data about the second operation screen:

the display control section (i) moves the cursor from the switch function icon selected on the first operation screen to the initial selection icon pre-set on the second operation screen and (ii) causes the display device to display a visual effect indicative of a predetermined direction from position of the switch function icon on the first operation screen to position of the initial selection icon on the second operation screen, the position of the initial selection icon is pre-set on the second operation screen when the instruction to execute the function of the switch function icon is inputted, the operation direction being relative to the switch function icon, wherein:

the display control section displays the visual effect, which indicates the predetermined direction from the position of the switch function icon to the position of the initial selection icon, on the first operation screen for a predetermined period of time before start of the switch of the display from the first operation screen to the second operation screen;

when the display is switched from the first operation screen to the second operation screen in response to input by the user of an instruction to execute the function of the switch function icon selected on the first operation screen and it is determined that the position of the initial selection icon on the second operation screen is not pre-designated in the acquired data about the second operation screen:

the display control section switches from the first operation screen to the second operation screen without displaying the moving image and the visual effect indicative of the predetermined direction to the position of the initial selection icon.

15. The display control device according to claim 14, wherein:

when the display is switched from the first operation screen to the second operation screen, the display control section tones down the first operation screen and displays the visual effect, which indicates the predetermined direction from the position of the switch function icon to the position of the initial selection icon, on the toned down first operation screen.

* * * * *